United States Patent [19]

Jacques et al.

[11] Patent Number: 4,514,511

[45] Date of Patent: Apr. 30, 1985

[54] PREPARATION OF SPHEROIDAL ALUMINA PARTICULATES

[75] Inventors: Roland Jacques, Ales; Thierry Dupin, Garges/les/Gonesse, both of France

[73] Assignee: Rhone-Poulenc Specialites Chimiques, Courbevoie, France

[21] Appl. No.: 496,138

[22] Filed: May 19, 1983

[30] Foreign Application Priority Data

May 19, 1982 [FR] France .............................. 82 08774

[51] Int. Cl.$^3$ ........................ B01J 37/00; B01J 21/04
[52] U.S. Cl. ...................................... 502/8; 502/355
[58] Field of Search .................................. 502/8, 355

[56] References Cited

U.S. PATENT DOCUMENTS

| | | | |
|---|---|---|---|
| 2,620,314 | 12/1952 | Hoekstra | 502/8 |
| 3,464,928 | 9/1969 | Mathies | 502/8 |
| 3,558,508 | 1/1971 | Keith et al. | 502/8 |
| 4,011,096 | 3/1977 | Sandell | 502/8 X |
| 4,013,587 | 3/1977 | Fischer et al. | 502/8 |

*Primary Examiner*—Patrick Garvin
*Attorney, Agent, or Firm*—Burns, Doane, Swecker & Mathis

[57] ABSTRACT

Spheroidal alumina particulates well adapted as catalysts or catalyst supports and having enhanced pore volumes are facilely prepared by drop coagulating an aqueous suspension or dispersion of alumina, or an aqueous solution of a basic aluminum salt, said suspension, dispersion or solution comprising an oil-in-water emulsion, and then recovering, drying and calcining the gelled particulates which result.

11 Claims, 2 Drawing Figures

PREPARATION OF SPHEROIDAL ALUMINA PARTICULATES

BACKGROUND OF THE INVENTION

1. Field of the Invention

The present invention relates to the preparation of spheroidal alumina particulates shaped by drop coagulation, and to the utilization of such particulates as catalyst supports.

2. Description of the Prior Art

It is known to this art, from published European patent Application No. 15,801, assigned to the assignee hereof, to prepare spheroidal alumina particles having bifold porosity by the method designated "oil drop" or "drop coagulation".

The process described in the aforenoted application comprises a mixture, at a pH of less than about 7.5, of a sol of ultra-fine boehmite or of psuedo-boehmite with spheroidal alumina particulates in a proportion ranging from 30 to 95% by weight. The boehmite sol has a concentration ranging from 5 to 25%. The spheroidal alumina particles are in the form of at least one of the phases included in the group consisting of eta, gamma, delta and theta. Same have a micropore volume ranging from 0.4 to 1 $cm^3/g$; their specific surface area ranges from 100 to 350 $m^2/g$ and their diameter ranges from 1 to 50 microns; their shaping into the spheroidal form and the gelation of the droplets of the mixture, the recovery of the gelled spheres, and their drying and calcination at a temperature ranging from 550° to 1100° C. Cf. U.S. Pat. No. 4,315,839.

The shaping into the spheroidal form and the gelation of the droplets employed in the process is effected by dripping droplets of the mixture into a column containing an upper phase consisting of petroleum and an aqueous lower phase consisting of an ammonia solution. The shaping process takes place in the upper phase and the gelation essentially in the lower phase. The temperature of the petroleum is typically close to ambient temperature. The pH of the ammonia solution is maintained at a value higher than approximately 9. The retention time of the droplets in the ammonia is a few minutes and is generally less than 15 minutes. Under these conditions, the spheroidal particles collected are sufficiently solid and are not deformed by subsequent manipulations.

The aforesaid process has numerous advantages. In particular, it makes it feasible to begin with readily accessible raw materials which are easy to prepare, and it permits the obtention of lightweight products without the need to use pore-forming agents. Finally, it makes it possible to eliminate an aging stage of the spheroidal particles in ammonia after their gelation.

SUMMARY OF THE INVENTION

A major object of the present invention is the provision of another and improved process for the preparation of spheroidal alumina particulates shaped by drop coagulation to provide spheroidal particles having very low attrition loss and a flow behavior in catalytic processes conducted in fluidized or bubbling beds, or in catalyst recirculation, that is of particular interest.

Another object of this invention is the provision of spheroidal alumina particulates which have an increased total pore volume without adversely affecting their mechanical strength. This characteristic renders their use as catalysts or catalyst supports particularly advantageous, as the lightness of the spheres reduces their thermal inertia, thereby permitting attainment of temperatures of utilization much more rapidly.

The process of the invention is particularly suitable for the preparation of alumina catalyst supports of high purity, used in particular in hydrocarbon conversion processes.

Briefly, the present invention features a process for the preparation of spheroidal alumina particulates of the type which includes the shaping by drop coagulation of an aqueous suspension or dispersion of alumina, or of a basic aluminum salt, recovery of the spheroidal particles formed, their drying and calcination, characterized in that the aqueous suspension or dispersion of alumina, or the solution of the basic salt of aluminum, comprises an oil-in-water type emulsion.

DETAILED DESCRIPTION OF THE INVENTION

Figure 1:
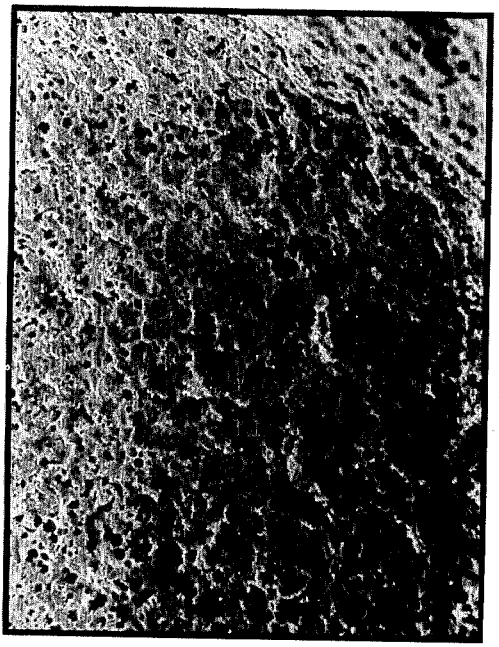

More particularly according to the present invention, albeit without wishing to be bound by or to any particular theory, it is reasoned that the increase in the total pore volume is obtained by virtue of the emulsion which creates a certain porosity inside the spheroidal particles after calcination.

The processes for the preparation of spheroidal alumina particulates, including shaping by drop coagulation of an aqueous suspension or dispersion of alumina, recovery of the product spheroidal particles, their drying and calcination, are processes well known to those skilled in the art and have been widely described in the literature. Such processes may be classified, for example, in three distinct categories:

The first category concerns the processes based on increasing the pH of the aqueous alumina suspension or dispersion, causing gelling of the droplets. According to these processes, droplets of the aqueous alumina suspension or dispersion are generally introduced in a liquid that is not completely miscible with water, such that the droplets form spherical particles, which subsequently are coagulated simultaneously with and/or after their shaping into the spheroidal form, by a change in the pH with the aid of a gelation agent.

The liquid non-miscible with water may be such that the droplets descend (the density of the liquid is less than the apparent density of the droplets) or ascend (the density of the liquid is higher than the apparent density of the droplets) in the treating liquid; for example, liquids non-miscible with water and suitable for use in the process of the invention are petroleum, kerosene, dodecylbenzene, trichloroethylene, perchloroethylene, organic solvents, hydrocarbons and mineral oils in general.

The gelation agent may advantageously be ammonium chloride, ammonia, ammonium carbonate, long chain fatty amines (particularly those marketed under the trademark Primene), hexamethylene tetramine, urea, or the like.

The liquid non-miscible with water is used at a temperature generally ranging from 60° to 120° C. when the gelation agent is an ammonia precursor, such as hexamethylene tetramine or urea.

The droplets treated in this manner are recovered from the shaping and/or coagulating medium, dried and then calcined.

Such processes, which employ either aqueous suspensions or dispersions of alumina, or solutions of basic aluminum salts have been described extensively in the literature and, in particular, in U.S. Pat. Nos. 2,435,379, 2,620,314, 3,346,336, 3,096,295, 3,275,234, 3,600,129, 3,943,071, 3,979,334 and 4,116,882 and in European Pat. Nos. 1,023 and 15,801.

According to a preferred embodiment of the invention, the shaping by drop coagulation of an aqueous suspension or dispersion of alumina is effected by introducing the droplets in a column containing an upper phase consisting of petroleum and an aqueous lower phase consisting of an ammonia solution. The shaping takes place in the upper phase and gelation essentially in the lower phase. The temperature of the petroleum is generally close to ambient temperature. The pH of the ammonia solution must be maintained above approximately 9. The retention time of the droplets in the ammonia amounts to a few minutes and is generally less than approximately 15 minutes. Under these conditions, the spheroidal particles recovered are sufficiently solid and are not deformed during subsequent manipulations.

The second category concerns the processes based on the removal of water from droplets of the aqueous suspension or dispersion of alumina by drying, or by the introduction or placing in suspension of the droplets in a non-miscible liquid, capable of removing the water. This results in gelling of the droplets. The drying process, or the non-miscible liquid, extracts the water from the droplets and causes them to gel into the spheroidal form; as the non-miscible liquid, 2-ethyl-1-hexanol or a long chain fatty aliphatic alcohol (marketed under the trademark Octylol) may be used. The principal stages, together with an apparatus for carrying out the gelling process, are described specifically in P. A. Haas, F. G. Kitts and H. Bentler, *Chemical Engineering Progress Symposium Series*, 63, No. 80, pp. 16–27 (1967); I. Amato and D. Martorana, *Rev. Int. Hautes Temp. et Refract.*, 9, pp. 197–204 (1972). If drying is used, the droplets are typically generated in a stream of hot gas at a temperature ranging from 100° to 1200° C.

The third category concerns processes based on the cross-linking of a polymer which produces the gelation of the droplets.

According to these processes, the aqueous suspension or dispersion of alumina is mixed with at least one water soluble monomer, the non-cross-linked polymer of which is soluble in water or forms a gel; the mixture obtained is subsequently dispersed in the form of droplets in a hot fluid medium in which substantial polymerization of the monomer takes place. The monomer may be an acrylic compound of the general formula

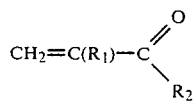

wherein $R_1$ is H or the methyl radical, $R_2$ is an $OR_3$ or $NR_3R_4$ radical, in which $R_3$ and $R_4$ represent H or a hydrophilic radical, in particular a hydroxyalkyl radical containing in particular 1 to 2 carbon atoms or a methoxymethyl radical. The principal stages of this process are described specifically in French Pat. Nos. 2,261,056 and 2,261,057.

The spheroidal particulates obtained are subsequently separated from their gelation medium, and then dried and calcined.

The aqueous suspension or dispersion of alumina employed according to the invention must be gellable or coagulable by the foregoing processes.

The aqueous suspensions or dispersions of alumina that may be used according to the invention are in particular aqueous suspensions or dispersions of fine or ultra-fine boehmites, which consist of particles having dimensions within the colloidal range, i.e., less than approximately 2000 Å.

The aqueous suspensions or dispersions of fine or ultra-fine boehmites may be obtained, as is well known to those skilled in this art, by the peptization in water or acidified water of these materials. The fine or ultra-fine boehmites used according to the present invention may be obtained in particular by the process described in French Pat. Nos. 1,261,182 and 1,381,282, or in published European patent application No. 15,196, also assigned to the assignee hereof.

French Pat. No. 1,261,182 described, in particular, a process for the preparation of fine or ultra-fine boehmite by the heating of an aqueous dispersion of alumina in the presence of a monovalent acid radical, the aqueous alumina dispersion having been obtained from basic aluminum chloride, basic aluminum nitrate, aluminum hydroxide, alumina gel or colloidal solutions of alumina. This product, marketed by the E. I. Du Pont de Nemours Company under the trademark Baymal, represents a fibrillar, fine or ultra-fine boehmite, the specific surface area of which generally ranges from 250 to 350 m²/g.

French Pat. No. 1,381,282 described, in particular, a process for the preparation of fine or ultra-fine boehmite consisting of developing at a temperature between 60° and 150° C. a suspension or cake of an amorphous hydrated alumina containing up to 35% by weight of alumina calculated as $Al_2O_3$, and with respect to this alumina calculated in $Al_2O_3$ molecules, a quantity of monovalent acid ions varying from 0.05 to 0.5, for a period of time ranging from 15 hours to 10 days, the cake having been obtained by the drying, washing and filtration of an alumina gel continuously precipitated at a pH ranging from 8 to 9 from a solution of sodium aluminate and nitric acid. The specific surface area of these products generally varies from 200 to 600 m²/g.

European patent application No. 15,196 describes, in particular, a process for the preparation of boehmite, at least in part in the form of ultra-fine boehmite, by the treatment in an aqueous medium having a pH less than 9, of an active alumina powder obtained by the rapid dehydration of hydrargillite in a stream of hot gases. Cf. U.S. Pat. No. 4,344,928.

It is also possible to use aqueous suspensions or dispersions obtained from pseudo-boehmite, amorphous alumina gels, aluminum hydroxide gels, or ultra-fine hydrargillite.

The pseudo-boehmite may be prepared by the process described in U.S. Pat. No. 3,630,670 by the reaction of a solution of an alkaline aluminate with a solution of a mineral acid. It may also have been prepared, as described in French Patent No. 1,357,830 by precipitation at pH 9, at a temperature slightly higher than ambient temperature, from reagents having a concentration such that approximately 50 g/1 alumina are obtained in the dispersion.

The amorphous alumina gels may also have been prepared by the processes described in the article *Alcoa Paper No.* 19, pages 9 to 12 (1972), and specifically by the reaction of an aluminate and an acid, or an aluminum salt and a base, or an aluminate and an aluminum salt, or by the hydrolysis of basic aluminum salts.

The aluminum hydroxide gels may specifically be those prepared according to the processes described in U.S. Pat. Nos. 3,268,295 and 3,245,919.

The ultra-fine hydrargillite may be prepared, in particular, by the process described in French Pat. No. 1,371,808, by the development at a temperature ranging from ambient temperature to 60° C. of alumina gels in the form of cakes and containing, with respect to the alumina calculated as $Al_2O_3$ molecules, 0.10 monovalent acid ions.

Aqueous suspensions or dispersions of boehmite or ultra-pure pseudo-boehmite prepared by the process described hereinafter, may also be used.

This process is of the type according to which the reaction of an alkaline aluminate with a carboxylic acid anhydride to form a precipitate of amorphous aluminum hydroxycarbonate is effected, the precipitate obtained separated by filtration, then washed (the process is specifically described in U.S. Pat. No. 3,268,295).

Subsequently:

(a) in a first stage, the washed amorphous aluminum hydroxycarbonate is mixed with a solution of an acid, a base or a salt, or mixtures thereof; this mixture is prepared by pouring the solution onto the hydroxycarbonate, with the pH of the medium prepared in this manner being less than 11;

(b) in a second stage, the reaction medium formed in this manner is heated to a temperature of less than 90° C. for a period of time of at least 5 minutes; and (c) in a third stage, the medium resulting from the second stage is heated to a temperature ranging from 90° C. to 250° C.

According to this process, the temperature of the second stage treatment ranges from 50° to 85° C., and the duration of such treatment ranges from 5 minutes to 5 hours.

According to the process, the acid employed in the first stage is a strong or weak mineral or organic acid soluble in water and preferably selected from among: nitric acid, perchloric acid, sulfuric acid, hydrochloric acid, hydroiodic acid, hydrobromic acid, formic, acetic, propanoic, butanoic, oxalic, maleic, succinic, glutaric acid, chloro- and bromoacetic acid.

Also consistent therewith, the base employed in the first stage is a weak base soluble in water and preferably selected from among: ammonia, amines such as the methylethylpropylamines, the aminoalcohols, such as the mono-, di- or triethanolamines, and 2-aminopropanol, quaternary ammonium hydroxides and compounds capable of decomposition under the conditions of reaction to yield a base, such as, for example, hexamethylene tetramine or urea.

Also according to the process, the salt employed in the first stage is selected from among the salts derived from ammonia and amines, and those containing the aluminum cation and containing the nitrate, chloride, formate, citrate, acetate or oxalate anions.

And in the first stage, the concentration of the aluminum compound expressed in $Al_2O_3$ of the mixture ranges from 20 to 400 g/l expressed in $Al_2O_3$ and preferably ranges from 40 to 200 g/l.

According to the process, in the mixture, in the first stage, the molar ratio of the sum of the anions and the cations present (with the exclusion of $H^+$ and $OH^-$) and the equivalent expressed in $Al_2O_3$ of the aluminum compound ranges from 0.01 to 2 and preferably ranges from 0.03 to 0.9.

Also according to the process, the temperature of heating in the third stage ranges from 100° to 160° C., with the duration of heating ranging from 10 minutes to 30 hours and preferably ranging from 30 minutes to 10 hours.

The dispersions or suspension of boehmite and pseudo-boehmite obtained according to this process have an alkaline content of less than 0.005% expressed in the form of the weight proportion of oxide of alkaline metal/$Al_2O_3$.

If it is desired to prepare according to the process of the invention very pure alumina catalyst supports, preferably aqueous suspensions or dispersions of boehmite or pseudo-boehmite of very high purity are employed, prepared by the aforedescribed process, or peptized aluminum hydroxide gels prepared by the hydrolysis of aluminum alcoholates by a process of the type described in U.S. Pat. No. 2,892,858.

The process to prepare such aluminum hydroxide gels of the boehmite type, obtained as a by-product of the preparation of alcohol by hydrolysis of an alcoholate or alkoxide of aluminum (Ziegler synthesis), will be described hereinbelow. The reactions of the Ziegler alcohol synthesis are described, in particular, in U.S. Pat. No. 2,892,858. According to this process, triethyl-aluminum is initially prepared from aluminum, hydrogen and ethylene, the reaction being carried out in two stages with a partial recycling of the triethylaluminum.

$$Al + 3/2\ H_2 + 2\ Al(C_2H_5)_3 \rightarrow 3\ Al(C_2H_5)_2H$$
$$3\ Al(C_2H_5)_2H + 3\ C_2H_4 \rightarrow 3\ Al(C_2H_5)_2 \text{ ethylene is added in the polymerization stage:}$$

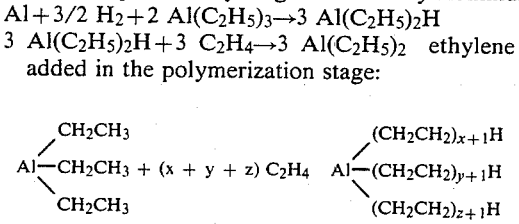

and the product obtained is then oxidized to aluminum alcoholate:

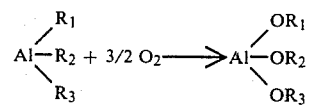

the alcohols being obtained by hydrolysis:

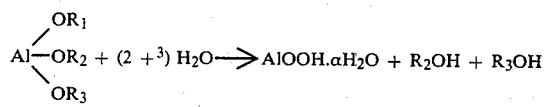

The aluminum hydroxide paste obtained may be used, optionally after drying and calcination, according to the process of the invention.

The hydrated alumina obtained as a by-product in the Ziegler reaction is described, in particular, in a bulletin of the Conoco Co. of Jan. 19, 1971. The products described in this bulletin are marketed under the trademark CATAPAL ®. Furthermore, Condea Chemie Co. also markets such products under the trademarks PURAL ® and DISPURAL ®. When these hydrated aluminas are present as powders in the form of a gel, they are peptized by water or an acidified solution.

The solutions of basic aluminum salts that may be employed according to the invention are those of the general formula $Al_2(OH)_xA_y$ wherein $0<x<6$ and $ny<6$, with n representing the number of charges of the anion A, the latter being selected from among: nitrates, chlorides, sulfates, perchlorates, chloroacetates, dichloroacetate, trichloroacetates, bromoacetates, dibromoacetates and the anions of the general formula

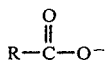

wherein R represents a radical selected from the group comprising H, $CH_3$, $C_2H_5$, $CH_3CH_3CH_2$, $(CH_3)_2CH$.

It is generally preferable to use aluminum hydroxychlorides. These basic aluminum salts may be obtained in particular by the digestion of metallic aluminum in HA acid or in a solution of $AlA_3$, by the electrolysis of a solution of an aluminum salt, by the neutralization of a more or less basic aluminum salt by a base and elimination of the salt formed, by the reaction of an aluminum salt with an electron donor such as ethylene oxide and elimination of the product of the reaction, by contacting an aluminum salt with a solvent non-miscible with water and containing a long chain aliphatic amine, followed by the aqueous phase containing the basic salt and concentration, by the peptization of a freshly precipitated alumina gel, by the attack on an aluminum oxide or hydroxide by an HA acid.

The concentration expressed in $Al_2O_3$ of the suspension, the dispersion or the solution generally ranges from 5 to 30%; it should generally be such that its viscosity ranges from 100 to 800 centipoises.

According to another embodiment of the process of the invention, the alumina suspensions or dispersions, or the solutions of basic aluminum salts, may contain an alumina filler.

The proportion of the filler in the solution, dispersion or suspension may be up to 90% by weight expressed in $Al_2O_3$ with respect to the total alumina content.

The dimensions of the alumina particles constituting the filler may vary over broad limits. Same typically range from 1 to 50 microns.

The alumina filler employed may be composed entirely of alumina. In particular, hydrated alumina compounds may be used, such as: hydrargillite, bayerite, boehmite, pseudo-boehmite and amorphous or essentially amorphous alumina gels. The dehydrated or partially dehydrated forms of these compounds, which consist of transition alumina and which contain at least one of the phases included in the group comprising rho, chi, eta, gamma, kappa, theta, delta, alpha, may also be used.

In particular, alumina fillers obtained by one of the following processes may be employed, optionally after grinding and screening:

(i) An aqueous solution of an aluminum salt is precipitated by a solution of an alkaline aluminate, the precipitate obtained is atomized and re-suspended in an aqueous solution having a pH ranging from 4.5 to 7, the alumina slurry obtained is atomized and dried and subsequently the product is washed, dried and calcined (process described in U.S. Pat. No. 3,520,654).

(ii) By precipitation of an alumina gel at a pH ranging from 7.5 to 11, the washing, drying, re-suspension, rapid dehydration of the product in a stream of hot gases at an inlet temperature of approximately 350° to 1000° C., followed by calcination (process described in French Pat. No. 2,221,405).

(iii) By the precipitation of an alumina gel at a pH ranging from 7 and 10.5, aging of the precipitate at a pH ranging from 10 to 11, homogenization and atomization at 250°–550° C. of the slurry obtained, followed by calcination (process described in British Pat. No. 888,772).

(iv) By the precipitation of an alkaline aluminate by a mineral acid at a temperature ranging from 30° to 75° C., aging in a second reactor at 35°–70° C. at a pH of 7, recycling of the slurry obtained in the mixing reactor, filtering, washing, drying of the product by atomization, followed by calcination (process described in U.S. Pat. No. 3,630,670).

(v) By the rapid dehydration of aluminum hydroxides or oxyhydroxides and more particularly hydrargillite in a stream of hot gases; this dehydration being effected in any appropriate apparatus with the aid of a stream of hot gases, the inlet temperature of the gases into the apparatus generally varying from about 400° to 1200° C., with the contact time of the hydroxide or oxyhydroxide with the hot gases generally ranging from a fraction of a second to 4–5 seconds; such a process for the preparation of active alumina powder being described, in particular, in French Patent No. 1,108,011.

(vi) By treatment in an aqueous medium having a pH lower than 9 of an active alumina powder obtained by the rapid dehydration of hydrargillite in a stream of hot gases, drying and atomization, followed by calcination. (process described in published European patent Application No. 15,196).

Furthermore, as the alumina filler according to the process of the invention, any particulate alumina obtained by the grinding of preshaped alumina bodies, may also be used.

If it is desired to prepare according to the invention catalyst supports of high purity alumina, preferably alumina fillers obtained by the drying and calcination of aqueous suspensions or dispersions of ultra-pure boehmite or pseudoboehmite, obtained by the process described hereinabove, or aluminum hydroxide gels prepared by the hydrolysis of aluminum alcoholates, are used.

According to another embodiment of the invention, it is possible to replace a portion of the alumina suspension or dispersion, or of the initial solution of the basic aluminum salt, by sols of other elements, for example, if they exist, of elements of Groups $I_B$, $III_B$, $IV_B$, $V_B$, $VI_B$, $III_A$, $IV_A$, $V_A$, $VI_A$, VIII of the Periodic Table; it is equally possible to mix the initial suspension or dispersion or solution with different salts and in particular those constituted with the metals of Group $I_B$, $II_B$, $III_B$, $IV_B$, $V_A$, $VI_A$, $VII_A$, VIII and the elements of Group $VI_B$ of the Periodic Table.

It too is equally possible to mix the suspension or dispersion or initial solution with any compound, whether catalytically active or not, among which the following are representative: powders of the metals of Group $I_B$, $II_B$, $III_B$, $IV_B$, $V_B$, $VII_B$, $I_A$, $II_A$, $III_A$, $IV_A$, $V_A$, $VI_A$, $VII_A$, VIII and the elements of Group $VI_B$, these powders being the metals or elements themselves, or their oxides, their insoluble salts, solid solutions and mixed oxides thereof.

Consistent herewith, the aqueous alumina suspension, dispersion or the solution of a basic aluminum salt, optionally containing an alumina filler, is in the form of an oil-in-water type emulsion.

It is well known that an emulsion of oil-in-water type is a heterogeneous system consisting of a dispersion of fine globules of a liquid (designated hereafter the "organic phase") in water, such that the water forms a continuous phase in the presence of a surface active or emulsifying agent, with the surface active or emulsifying agent making it possible to obtain a good dispersion of the organic phase in the continuous phase (water) by modifying the properties of the interface between the two liquids.

According to this invention, the dispersion to form the emulsion is effected by the agitation of the aqueous alumina dispersion or suspension, or the solution of a basic aluminum salt, optionally containing a filler, in the presence of a surface active or emulsifying agent. The emulsion obtained in this manner should have a viscosity ranging from about 100 to about 800 centipoises and preferably ranging from 300 to 400 centipoises. The viscosities indicated are measured by the so-called "Couette" method, which consists of a viscosimeter with coaxial cylinders.

The proportion of the organic phase in the aqueous phase (the aqueous phase being represented by the free water present in the emulsion) ranges from about 0.5 to about 40% and preferably ranges from about 1 to about 10%; this proportion, even though not critical, affects the mechanical strength of the spheroidal alumina particulates prepared by the process of the invention.

The organic phase of the emulsion must consist of products which are not completely miscible with water, may be eliminated by combustion and are liquid at ambient temperature. It may be selected from among those phases most frequently encountered industrially and falling within the following categories: oils, fats and mineral waxes; fatty bodies: glycerides or cerides and the usual solvents. A description of these materials is found, in particular, in the work *Aqueous Dispersions* by Jean Pore, published by the Le Cuir publishing company. Preferably, petroleums and kerosenes with a density of about 0.78, are used.

The surface active or emulsifying agent is selected such as to insure the stability of the emulsion; it also should be eliminable by combustion and be liquid at ambient temperature, and, if it is desired to prepare an emulsion of the oil-in-water type, a surface active agent with a hydrophilic tendency is selected. The selection of this agent will be made bearing in mind methods well known to those skilled in the art and described in particular in the work *Emulsions: Theory and Practice* by Paul Becher, Reinhold Publishing Corp. (1957). If an organic phase such as petroleums or kerosenes is used, the H.L.B. of the surface active agent selected should preferably approximate that of the organic phase to be dispersed, i.e., be generally within 8 and 20, and more particularly between 10 and 14.

According to the process of the invention, the shaping by drop coagulation of the aqueous alumina suspension or dispersion in the form of an oil-in-water type emulsion is effected by techniques well known to those skilled in the art and set forth hereinabove. The spheroidal particles obtained are subsequently recovered and are then dried and calcined.

The characteristics of the spheroidal particulates that may be obtained according to the invention are very extensive. The particles may have, in particular, a monomodal or bimodal pore structure, with a total pore volume varying from 0.30 cm$^3$/g to 3 cm$^3$/g and a specific surface area up to 350 m$^2$/g and attrition resistance in excess of 95% and generally higher than 98%.

The pore volume of the spheroidal particulates of the invention is characterized in that it contains closed macropores, i.e., pores having a diameter ranging from approximately 0.2 to 15 micrometers, which are accessible only through micropores having a diameter ranging from 50 to 200 Å or mesopores having a diameter ranging from 200 and 1000 Å.

The quantity of closed macropores in the spheroidal particulates varies as a function of the proportion of the organic phase in the aqueous phase employed in the process for the preparation of the spheroidal alumina particulates of the invention.

The pore volume consisting of closed macropores of the particulates of the invention ranges from 0.01 to 0.5 cm$^3$/g.

The characteristic closed microporosity of the particles of the invention may be demonstrated by scanning electron microscopy.

The particles obtained by the process of the invention have an increased total pore volume. This property renders their utilization particularly advantageous in catalytic reactions, because their thermal inertia is less, whereby they are able to attain the temperature of the catalytic reaction more rapidly.

The alumina spheroids of the invention have a remarkable resistance to attrition, which makes their utilization in processes operated in fluidized or bubbling beds particularly advantageous.

The particles according to the invention may be used in adsorption or in catalysis as catalysts or catalyst supports to carry out various reactions, such as, for example: dehydration, hydrosulfurization, hydrodenitrification, desulfurization, hydrodesulfurization, dehydrohalogenation, reforming, vapor reforming, cracking, hydrocracking, hydrogenation, dehydrogenation, isomerization, dismutation, oxychlorination, dehydrocyclization of hydrocarbons and other organic compounds, oxidation and/or deoxidation reactions, the Claus reaction, the treatment of the exhaust gases of internal combustion engines, demetalization, and the like.

When the subject spheroidal particulates are prepared from ultra-pure alumina suspensions or dispersions, optionally in the presence of an ultra-pure alumina filler, and the product particulates are especially effective as catalyst supports in hydrodesulfurization, reforming, hydrocracking, isomerization and vapor reforming reactions.

In order to further illustrate the present invention and the advantages thereof, the following specific examples are given, it being understood that same are intended only as illustrative and in nowise limitative.

In said examples to follow, the tamped fill density (DRT) was measured in the following manner: a given weight of agglomerates was introduced into a graduated cylinder to fill the same with the agglomerates to a given volume. The cylinder was then vibrated until any settling was complete and until a constant volume was obtained. The weight of the agglomerates which occupied a unit volume was then calculated.

The total pore volume (VPT) was measured in the following manner: the value of the grain density and of the absolute density were determined: the grain density (Dg) and the absolute density (Da) were measured by the method of picnometry, respectively with mercury and with helium; VPT is given by the formula:

$$VPT = \frac{1}{Dg} - \frac{1}{Da}$$

The specific surface (SBE) was measured by the B.E.T. method.

Mechanical strength (EGG) was measured by the grain per grain crushing method. It consisted of measuring the maximum compression force that a granule was capable of withstanding before rupturing, when the product was placed between two plates being displaced at a constant velocity of 5 cm/min. In the particular case of spheroids, the force is expressed in kilograms.

The mechanical strength (EGG) is related to the total pore volume (VPT) by the law of Schiller:

$$EGG = A \log \frac{B}{D_g} \times VPT$$

wherein A and B are constants. Thus, when the porosity of the product (VPT) increases, the EGG decreases; it is therefore difficult to prepare products which are both porous and strong.

The resistance to attrition (AIF) was measured by the percentage of the product not worn off by friction by the following method: a given volume (60 cm$^3$) of the agglomerate was introduced in an inverted Erlenmeyer flask of special design connected with a metal inlet orifice. A large outlet orifice (2.54 cm), covered by a sieve with a 1.168 mm mesh, was placed on the bottom of the Erlenmeyer flask; a strong flow of dry nitrogen was passed through the inlet orifice; it had two functions, on the one hand to circulate the agglomerates against each other, thereby causing them to wear by friction, and on the other, to impact the agglomerates against the Erlenmeyer flask, thereby introducing their degradation according to the intensity of the impact. The product was tested for 5 minutes and the weight of the remaining agglomerates was measured. The reduction in weight following the experiment, expressed in a percentage of the initial charge represents the resistance to attrition, AIF.

The characteristic macroporosity of the spheroidal particulates of the process of the invention cannot be determined if the pore distribution is measured by the mercury penetration method. In fact, the size of the pores measured by this penetration method accounts only for the micropores or mesopores. Therefore, the measurement of the pore volume corresponding to the closed macropores was effected by the following method: the difference between the value of the total pore volume as measured by the aforenoted method and the value of the pore volume measured at 25° C. by the adsorption of carbon tetrachloride was determined.

EXAMPLE 1

Into a 250 liter vat, containing 130 liters of demineralized water, the following materials were successively introduced under strong agitation:

(i) 2.700 l 63% nitric acid;

(ii) 33.3 kg aluminum hydroxide gel of the boehmite type, obtained as a by-product in the production of alcohol by Ziegler synthesis and marketed by the Condea Co. under the trademark PURAL ® SB with 75% Al$_2$O$_3$;

(iii) 9 kg of an alumina filler consisting of the preceding gel, calcined at 650° C. and ground such that the average diameter of the particles ranged from 4 to 5 microns; and (iv) 7 kg of a C$_{10}$–C$_{13}$ paraffin hydrocarbon marketed by the B.P. Co. under the designation SOLPAR ® 195–230 mixed with 450 cm$^3$ of Galoryl EM 10 ®, an emulsifying agent with H.L.B. 14.

The viscosity of the suspension after 4 hours of weak agitation was 350 centipoises.

The suspension contained 18.5% Al$_2$O$_3$, the ratio of the calcined alumina filler to the total alumina was 26.5%.

The proportion of the organic phase in the aqueous phase, hereafter referred to as the "hydrocarbon/free water" ratio, was 5%.

The emulsifying agent/hydrocarbon ratio was 6.4%.

The suspension, using a calibrated tube with an internal diameter of 1.3 mm and an external diameter of 1.8 mm, was dripped dropwise into a column containing an upper phase consisting of petroleum and having a depth of 6 cm and a lower aqueous phase consisting of an ammonia solution containing 20 g/liter NH$_3$.

The hydrogel particulates recovered were dried and calcined at 550° C.

Figure 2:
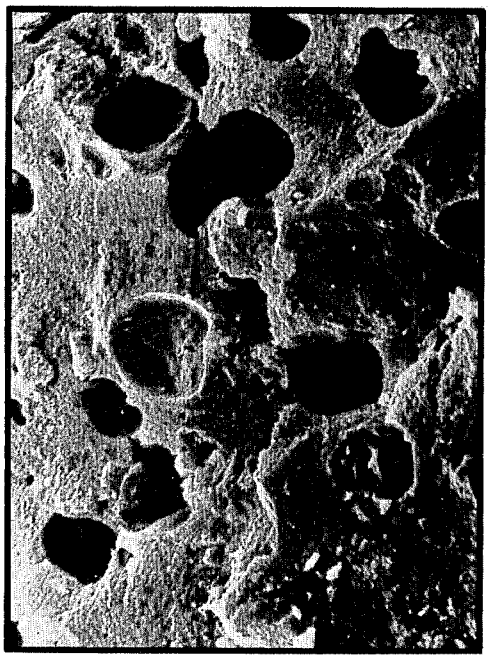

The characteristics of the particulates are reported in the Table which follows and the photomicrographs of FIGS. 1 and 2 of the drawings illustrate the inside of a spheroidal particulate at respective enlargements of 300× and 3000× obtained by means of scanning electron microscope.

FIG. 1 demonstrates well the existence of closed macropores of a size ranging from approximately 1 to 10 micrometers and FIG. 2 demonstrates the existence of closed macropores having a size ranging from approximately 0.2 to 10 micrometers.

These photomicrographs also demonstrate the lack of communication of the macropores among themselves, with the only communication existing between the macropores being effected by means of the micropores and mesopores which are present in the material that appears dense in the photomicrographs.

EXAMPLE 2

The preparation of the suspension and the gelling of the drops were effected as in Example 1.

In the suspension, only 3.5 kg hydrocarbon and 225 cm$^3$ Galoryl EM 10 ® were introduced.

The hydrocarbon/free water ratio was only 2.5%.

The characteristics of the dried and calcined particulates at 50° C. are reported in the Table which follows.

EXAMPLE 3

The preparation of the suspension and the gelling of the drops were effected as in Example 1, but using only 2.3 l nitric acid.

No alumina filler was introduced.

Under these conditions, the suspension contained 15% Al$_2$O$_3$.

The hydrocarbon/free water ratio was 5% and the emulsifier/hydrocarbon ratio was 6.4%.

The characteristics of the dried and calcined particulates are reported in the Table which follows.

EXAMPLE 4

The preparation of the suspension and the gelling of the droplets was effected as in Example 1, but the C$_{10}$–C$_{13}$ paraffin hydrocarbon SOLPAR ® was replaced by 3.5 kg cycloheptane having a density of 0.810 and a boiling point of 118° C.; the emulsifying agent used was Cemulsol NP 10 ®, an ethoxy alkyl phenol with H.L.B. 13.3–300 cm$^3$, were introduced.

The characteristics of the dried particulates calcined at 550° C. are reported in the Table which follows.

EXAMPLE 5

The preparation of the suspension and the gelling of the droplets were effected as in Example 1, by using:
 (i) 2 liters nitric acid at 63%;
 (ii) 40 kg Pural ® SB aluminum hydroxide gel;
 (iii) 21.2 kg alumina filler; and
 (iv) 10 kg Solpar ® 195–230 hydrocarbon mixed with 500 cm$^3$ Galoryl EM 10 ®.

Under these conditions, the suspension contained 25% Al$_2$O$_3$, the ratio of the calcined alumina filler to the total aluminum was 40%, the hydrocarbon/free water ratio was 8% and the emulsifying agent/hydrocarbon ratio was 5%.

The characteristics of the dried and calcined particulates are reported in the Table which follows.

EXAMPLE 6

2500 g of a sol of an ultra-fine boehmite containing 11.5% Al$_2$O$_3$ were mixed with 700 g of spheroidal alumina particles calcined at 650° C., having an average diameter of 6 microns.

The sols of the ultra-fine boehmite and the spheroidal alumina particles were prepared as set forth in Example 1 of European Pat. No. 15,801.

500 g water and then 200 g SOLPAR ® C$_{10}$–C$_{13}$ paraffin hydrocarbon and containing 25 g Galoryl EM 10 ® were added.

The hydrocarbon/free water ratio was 7.4%.

Spheroidal particulates were formed as indicated in Example 1.

The characteristics of the dried particulates calcined at 900° C. are reported in the Table which follows.

EXAMPLE 7

A filtered solution of sodium aluminate having an equivalent concentration of 81 g/l Al$_2$O$_3$ and 61.3 g/l Na$_2$O was introduced into a glass reactor with a mechanical agitator, thermometer and pH measuring electrode. Under strong agitation, a stream of gaseous CO$_2$ was passed therethrough at atmospheric pressure, such that a slight excess escaped from the reactor. The temperature was permitted to rise to 40° C. and was then maintained at this value by an external circulation of cold water. The flow of CO$_2$ was discontinued when, after 11 min, the pH had been lowered to 9.5 and agitation was continued for 5 min. The precipitate was separated by filtration and washed on the filter with water, continued at 30° C. until a filtrate with a resistivity of 3.10$^5$ ohms.cm was obtained. A sample of the filter cake dried in air at 30° shows no crystalline organization by X-ray diffraction. The residue of calcination at 1000° (Al$_2$O$_3$) was 51.3%.

The washed hydroxycarbonate precipitate was mixed at 20° with an aqueous solution of ammonia in quantities sufficient to obtain in the mixture, on the one hand, a resultant concentration in an aluminum compound expressed as Al$_2$O$_3$ of 50 g/1, and, on the other hand, a molar ratio between the concentration in NH$_4$+ (calculated by assuming complete ionization of the ammonia or of the product resulting from each reaction with the hydroxycarbonate) and the concentration in the aluminum compound expressed as Al$_2$O$_3$ of 0.20. To effect this mixture, the ammonia solution was poured progressively into the aqueous suspension of the hydroxycarbonate, under strong agitation. The pH of the aqueous medium obtained in this manner was 10.2.

In a second stage, the treating medium originating in the first stage was heated to a temperature of 85° over a period of 4 hours under atmospheric pressure.

In a third stage, the treating medium originating in the second stage was heated to a temperature of 150° C. for 6 hours. A solution of boehmite was obtained, which was filtered, washed with water and dried at 100° C.

Into a vat containing 9.3 liters of demineralized water, the following materials were introduced, successively and with strong agitation:
 (i) 150 cm$^3$ 63% nitric acid;
 (ii) 2160 g of the boehmite obtained in the operations described hereinabove;
 (iii) 1440 g of an aluminum filler obtained by calcination at 600° C. of the boehmite described previously; and
 (iv) 720 g of Solpar ® 195–230 hydrocarbon mixed with 36 cm$^3$ of Galoryl EM 10 ®.

Under these conditions, a suspension containing 25% Al$_2$O$_3$ having a ratio of the alumina filler to total aluminum of 40%, a hydrocarbon/free water ratio of 8% and an emulsifying agent/hydrocarbon ratio of 5%, was obtained.

The gelation of the droplets was effected as in Example 1.

The characteristics of the dried and calcined particulates are reported in the Table which follows.

EXAMPLE 8

To 10 kg of alumina hydroxychloride with 20% Al$_2$O$_3$ and 7% Cl, the following materials were added:
 (i) 500 g C$_{13}$–C$_{16}$, having a boiling point between 250° and 294° C. and containing 25 g Galoryl EM 10 ®; and
 (ii) 700 g hexamethylene tetramine dissolved in 1400 g water.

The hydrocarbon/free water ratio was 5.7%.

Droplets were formed which dripped into oil at 90° C.

The hydrogel particulates were heated to and maintained at 130° C. for 3 hours in a closed apparatus.

The pressure was limited to 3.5 bars.

The oil was replaced with an ammonia solution of 200 g/1 of NH$_3$.

The ammonia solution containing the particulates was heated to 90° C. for 4 hours.

The characteristics of the dried particulates calcined at 600° C. are reported in the Table which follows.

COMPARATIVE EXAMPLE 9

The preparation of the suspension and the gelling of the droplets were effected as in Example 1.

No hydrocarbon or emulsifying agent were introduced.

The hydrocarbon/free water ratio was equal to 0.

The viscosity of the suspension after 4 hours of weak agitation was 250 centipoises.

The characteristics of the dried particulates calcined at 550° C. are reported in the Table which follows.

TABLE

CHARACTERISTICS OF THE PARTICULATES

| Examples | BET surface, $m^2/g$ | VPT $cm^3/g$ | Pore volume consisting of closed macropores | Type of pore distribution | Average diameter of pores in Å | Pore volume in $cm^3/g$ of pores larger than $0.1\mu$ | Pore volume in $cm^3/g$ of pores larger than 1 micron | DRT | EGG Kg | AIF % |
|---|---|---|---|---|---|---|---|---|---|---|
| 1 | 210 | 0.63 | 0.18 | monomodal | 90 | 0 | 0 | 0.650 | 5.2 | 99.9 |
| 2 | 200 | 0.50 | 0.05 | monomodal | 90 | 0 | 0 | 0.760 | 6 | 99.9 |
| 3 | 200 | 0.56 | 0.11 | monomodal | 90 | 0 | 0 | 0.670 | 5 | 99.9 |
| 4 | 200 | 0.49 | 0.03 | monomodal | 90 | 0 | 0 | 0.750 | 6 | 99.9 |
| 5 | 200 | 0.66 | 0.20 | monomodal | 90 | 0 | 0 | 0.620 | 4.8 | 99.9 |
| 6 | 110 | 1.21 | 0.15 | bimodal |  | 0.65 | 0.52 | 0.380 | 2.2 | 99.5 |
| 7 | 220 | 0.62 | 0.15 | monomodal | 80 | 0 | 0 | 0.645 | 5 | 99.9 |
| 8 | 140 | 1.69 | 0.12 | bimodal |  | 0.60 | 0.01 | 0.289 | 2.2 | 99.8 |
| 9 (comparative) | 210 | 0.40 | 0.01 | monomodal | 90 | 0 | 0 | 0.850 | 8 | 99.7 |

The foregoing Table specifically evidences the advantage of the process which makes it possible to increase, in a surprising manner, the pore volume of the spheroidal particulates prepared thereby.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of spheroidal alumina particulates, which comprises drop coagulating an aqueous suspension or dispersion of alumina, or an aqueous solution of a basic aluminum salt, said suspension, dispersion or solution comprising an oil-in-water emulsion, wherein the viscosity of said emulsion ranges from 100 and 800 centipoises, said suspension, dispersion or solution further comprising an alumina filler, with the proportion of the filler being up to 90% by weight, expressed in $Al_2O_3$, with respect to the total alumina content, and thence recovering, drying and calcining the gelled particulates which result.

2. The process as defined by claim 1, said alumina filler comprising hydrargillite, bayerite, boehmite, pseudoboehmite, amorphous or essentially amorphous alumina gels, or dehydrated or partially dehydrated transition aluminas comprising at least one of the phases rho, chi, eta, gamma, kappa, theta, delta or alpha.

3. The process as defined by claim 1, wherein the total concentration expressed as $Al_2O_3$ of the suspension, dispersion or solution ranges from 5 to 30%.

4. The process as defined by claim 1, wherein the oil-in-water emulsion comprises an organic phase, an aqueous phase and a surface active or emulsifying agent, the proportion of the organic phase in the aqueous phase ranging from 1 to 40%.

5. The process as defined by claim 4, wherein the organic phase and the surface active or emulsifying agent are eliminable by combustion and are liquid at ambient temperature.

6. The process as defined by claim 1, wherein the suspension, dispersion or solution comprises a sol of an element of Group $I_B$, $III_B$, $IV_B$, $VI_B$, $III_A$, $V_A$, $VI_A$ or VIII of the Periodic Table.

7. The process as defined by claim 1, wherein the suspension, dispersion or solution comprises a powder of a metal of Group $I_B$, $II_B$, $III_B$, $IV_B$, $VII_B$, $I_A$, $II_A$, $III_A$, $IV_A$, $V_A$, $VI_A$, $VII_A$ or VIII of the Periodic Table, said powder further comprising a free metal or element, an oxide thereof, an insoluble salt thereof, a solid solution thereof, or a mixed oxide.

8. The spheroidal alumina particulates prepared by the process as defined by claim 1, comprising closed macropores having diameters ranging from 0.2 to 15 micrometers.

9. The spheroidal alumina particulates as defined by claim 8 wherein the pore volume corresponding to the closed macropores ranges from 0.01 to 0.5 $cm^3/g$.

10. The process as defined by claim 1, said viscosity ranging from 300 to 400 centipoises.

11. The process as defined by claim 4, said proportion ranging from 10 to 25%.

* * * * *